United States Patent [19]
Levy

[11] Patent Number: 5,742,228
[45] Date of Patent: Apr. 21, 1998

[54] SYSTEM FOR PREVENTING TIPPER TRUCK OVERTURNING

[75] Inventor: Nisim Levy, Kiryat Tivon, Israel

[73] Assignee: Litan Advanced Instrumentation Ltd., Nesher, Israel

[21] Appl. No.: 707,560

[22] Filed: Sep. 4, 1996

Related U.S. Application Data

[63] Continuation-in-part of Ser. No. 352,149, Dec. 1, 1994, abandoned.

[30] Foreign Application Priority Data

Dec. 24, 1993 [IL] Israel ................................ 108170

[51] Int. Cl.$^6$ .................................................. B60R 25/10
[52] U.S. Cl. .................... 340/429; 340/431; 340/440; 340/689; 180/282; 298/22 C; 364/424.07; 280/432; 280/DIG. 1
[58] Field of Search .................. 340/429, 431, 340/440, 689; 180/282, 283; 298/175, 22 C; 364/424.07; 280/432, DIG. 1

[56] References Cited

U.S. PATENT DOCUMENTS

| | | |
|---|---|---|
| 3,464,755 | 9/1969 | Brown . |
| 3,846,781 | 11/1974 | Smith . |
| 3,921,128 | 11/1975 | Snead . |
| 4,145,682 | 3/1979 | Cook . |
| 4,658,508 | 4/1987 | Oberg . |
| 4,821,218 | 4/1989 | Pötsch . |
| 4,952,908 | 8/1990 | Sanner . |

FOREIGN PATENT DOCUMENTS

| | | |
|---|---|---|
| 0031416 | 6/1977 | Japan . |
| 03285490 | 2/1991 | Japan . |

*Primary Examiner*—Jeffery Hofsass
*Assistant Examiner*—Nina Tong
*Attorney, Agent, or Firm*—Mark M. Friedman

[57] ABSTRACT

A system for preventing the overturning of the bin of a tipper truck during the raising of the bin for purposes of unloading includes a lateral level sensor to sense the lateral orientation of the tipper truck, and a longitudinal level sensor for sensing the longitudinal inclination of the bin. A processor processes the outputs of the lateral and longitudinal level sensors to derive a measure of risk of overturning. The system also includes a display for displaying an indication responsive to the measure of risk. The processor preferably processes the output of the lateral level sensor to calculate a rate of change of lateral inclination of the tipper truck. Optionally, a mechanism may be provided for interrupting the raising of the bin, the mechanism being responsive to the processor.

16 Claims, 2 Drawing Sheets

SYSTEM FOR PREVENTING TIPPER TRUCK OVERTURNING

This application is a Continuation-in-Part of U.S. patent application Ser. No. 08/352,149 filed Dec. 1, 1994, is now abandoned.

FIELD AND BACKGROUND OF THE INVENTION

The present invention relates to systems for preventing the overturning of trucks and, more particularly, to systems for reducing the number of overturning incidents of tipper trucks.

Tipper trucks have been in widespread use for decades. The term 'tipper truck' as used herein is intended to include any vehicle which is adapted for carrying loads in a special bin whose unloading is effected by lifting, typically using hydraulic means, a portion of the bin so as to allow the load to slide out of the bin.

Tipper trucks have a distinct advantage in the transportation of certain loads, such as sand, gravel, limestone, and the like, in that the unloading process is very rapid and, depending on the exact nature and condition of the load, the unloading is complete leaving virtually no load in the bin.

To unload a tipper truck, the truck is driven to the desired location. The back panel of the bin is unlocked. A portion of the bin is then raised, typically by pivoting the bin about an axis, using suitable hydraulic mechanism. When the bin is raised sufficient so that the angle between the bin and the horizontal exceeds a certain angle, the frictional forces between the load and the bottom and sides of the bin are overcome and the load slides out of the bin, thereby unloading the bin relatively quickly and completely.

A serious disadvantage of tipper trucks is their well known tendency to overturn, especially laterally, during unloading operations. Unloading operations are frequently performed under off-road conditions while the truck and bin are located on a base which is neither flat nor sturdy. The bin may thus start the unloading process somewhat tilted to one side or the other. Furthermore, the ground may shift during the unloading process, thereby accentuating the original tilt or producing a tilt even where none had been present initially. The pivoting of the bin so as to effect its unloading significantly raises the center of gravity of the vehicle which greatly accentuates the adverse effects of any lateral tilt.

When the tilt angle is sufficiently large and the bin is raised sufficiently high, particularly when the load is wet and clings to the bottom and sides of the bin, the bin, or both the bin and the truck, may tip over and overturn, endangering nearby personnel and equipment and damaging the equipment itself. Unfortunately, such incidents are very common and constitute a significant cost of operating such equipment.

A system aimed at reducing the overturning of bins and trucks is disclosed in DE 26 52 854, which is incorporated by reference as if fully set forth herein. Disclosed in the reference is a system which includes a transverse level sensor. When a pre-determined angle is exceeded in either sense the hydraulic system which lifts the bin is automatically locked so as to prevent the further raising of the bin in an attempt to prevent its overturning. While such a system is somewhat effective in enhancing the safety of the equipment in question, it suffers from a number of disadvantages which, in certain cases, could result in the overturning of even a truck equipped with such a system. Thus, there is no attempt to measure the truck or bin orientation in the back-and-forth direction. Additionally, there is no attempt to gauge the rate of change of the angle of tilt which could serve to alert of an impending dangerous condition. Furthermore, the system may prevent operation of the bin when the truck is on a slight incline although the load could, in fact, have been safely discharged by raising the bin to a moderate angle without danger of overturning.

There is thus a widely recognized need for, and it would be highly advantageous to have, a system for further reducing the incidence of overturning of tipper trucks which would be inexpensive to install and operate.

SUMMARY OF THE INVENTION

The present invention is of systems for preventing overturning of tipper trucks. According to the teachings of the present invention there is provided, a system for preventing the overturning of a tipper truck during the raising of a bin for purposes of unloading, the system comprising: (a) a lateral level sensor associated with the tipper truck generating an output indicative of the lateral orientation of the tipper truck; (b) a longitudinal level sensor associated with the bin of the tipper truck generating an output indicative of the longitudinal inclination of the bin; (c) a processor for processing the outputs of the lateral and longitudinal level sensors to derive a measure of risk of overturning; and (d) means for displaying an indication responsive to the measure of risk.

According to a further feature of the present invention, the processor includes means for processing the output of the lateral level sensor to calculate a rate of change of lateral inclination of the tipper truck.

According to a further feature of the present invention, the lateral level sensor is a clinometer.

According to a further feature of the present invention, the longitudinal level sensor is a clinometer.

According to a further feature of the present invention, the lateral level sensor is connected to the tipper truck.

According to a further feature of the present invention, the lateral level sensor is connected to the bin.

According to a further feature of the present invention, the lateral level sensor is connected to a chassis which supports the bin.

According to a further feature of the present invention, there is also provided means for interrupting the raising of the bin, the means being responsive to the processor.

According to a further feature of the present invention, the bin is raised using a hydraulic mechanism and wherein the means for interrupting the raising of the bin includes a valve for cutting off the inflow of hydraulic fluid into the hydraulic mechanism.

According to a further feature of the present invention, the bin is raised using a hydraulic mechanism and wherein the means for interrupting the raising of the bin includes a valve for releasing hydraulic fluid from the hydraulic mechanism so as to lower the bin.

According to a further feature of the present invention, the means for displaying an indication includes at least one alarm for indicating a potentially dangerous tilt angle.

According to a further feature of the present invention, the at least one alarm includes at least one light.

According to a further feature of the present invention, the at least one alarm includes one or more sounds.

There is also provided according to the teachings of the present invention, a method for preventing the overturning of a tipper truck during the raising of a bin for purposes of unloading, the method comprising the steps of: (a) generating a first output indicative of the lateral inclination of the tipper truck; (b) generating a second output indicative of the longitudinal inclination of the bin; (c) processing the first output to determine a maximum safe longitudinal inclination of the bin; and (d) comparing the second output with the maximum safe longitudinal inclination.

According to a further feature of the present invention, there is also provided a step of deriving a rate of change of lateral inclination of the tipper truck.

According to a further feature of the present invention, there is also provided a step of interrupting raising of the bin when said second output indicates a longitudinal inclination of the bin greater than said maximum safe longitudinal inclination.

According to a further feature of the present invention, there is also provided a step of interrupting raising of the bin when said rate of change of lateral inclination exceeds a given value.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system which can be used or eliminate the overturning of tipper trucks during their unloading.

The principles and operation of a system according to the present invention may be better understood with reference to the drawings and the accompanying description.

Figure 1:
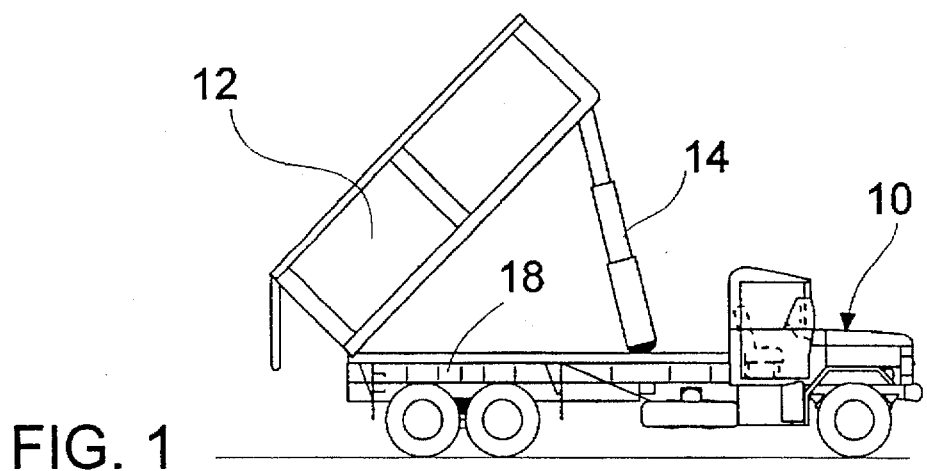
FIG. 1 is a side view of one type of tipper truck.
Figure 2:
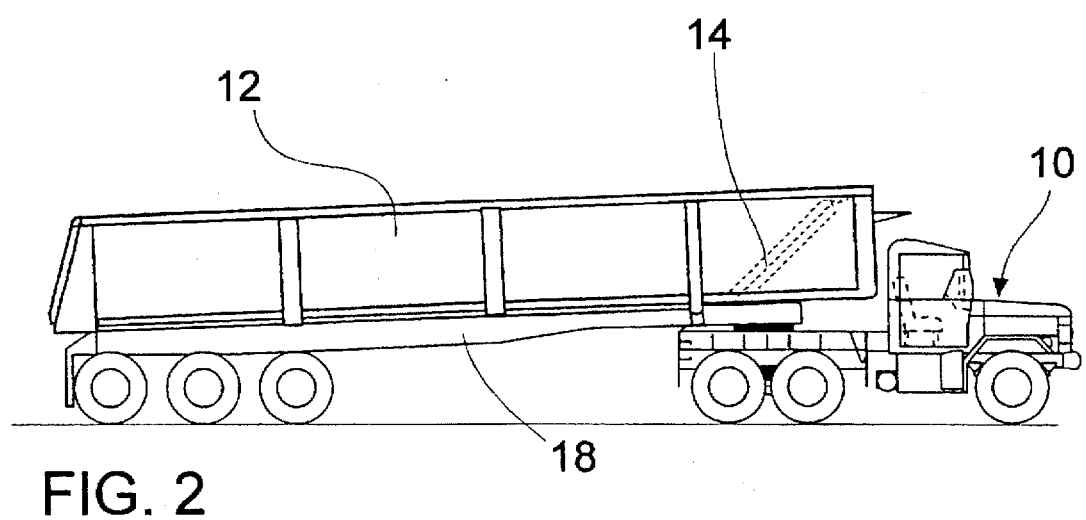
FIG. 2 is a side view of a second type of tipper truck.
Figure 3:
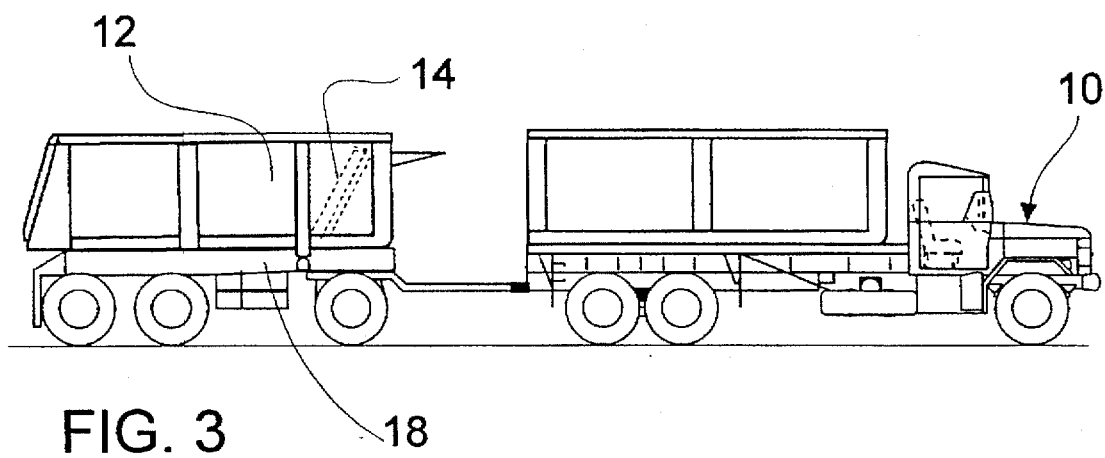
FIG. 3 is a side view of a third type of tipper truck.
Figure 4:
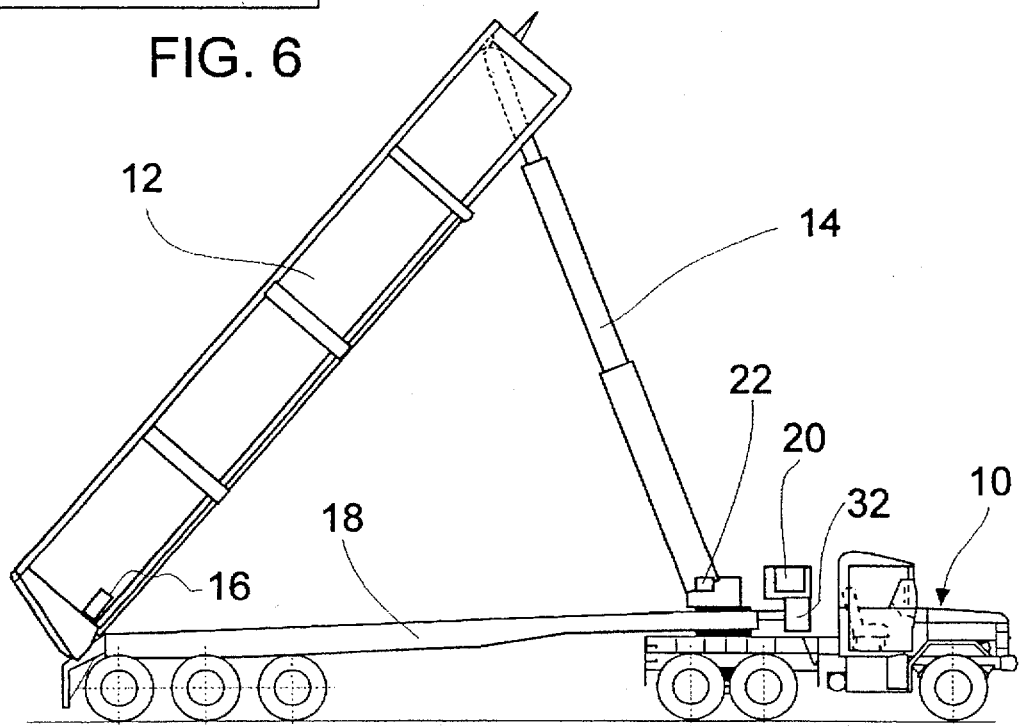
FIG. 4 is a side view of a tipper truck as in FIG. 2 equipped with a system according to the present invention as it appears during unloading.

Referring now to the drawings, FIG. 1-3 illustrate three examples of commonly found tipper truck configurations. In each case, the vehicle includes a truck 10 which includes the engine and driver compartment, and a bin 12 which is used to carry the loads. In each case, bin 12 is unloaded by raising one end of bin 12 (FIGS. 1 and 4) so as to cause the load to slide out of the open rear end of bin 12. The lifting of bin 12 can be effected by a variety of means. Most commonly, this is achieved through a suitable hydraulic mechanism 14 (FIGS. 1 and 4).

Shown in FIG. 1 is a self-contained tipper truck with an integral bin, while in FIGS. 2 and 3 bins 12 are towed by truck 10 in some appropriate manner.

Figure 5:
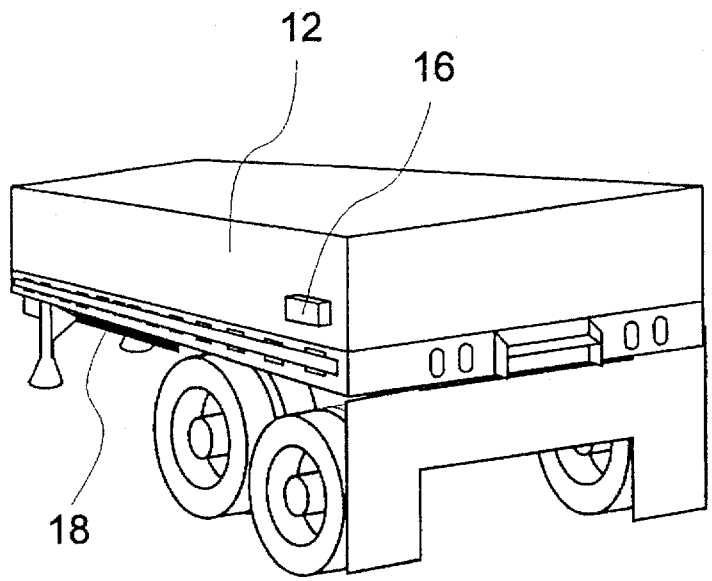
FIG. 5 is a rear perspective view of a bin as in FIGS. 2 and 4, showing one possible location of the level sensor.

A system for preventing the overturning of the bin of a tipper truck during the raising of the bin for purposes of unloading according to the present invention includes a level sensor 16 (FIGS. 4 and 5) to sense the orientation of the tipper truck.

Typically, the critical orientation is the lateral, or sideways, orientation, since the vehicle is most unstable, and thus overturning is most likely to occur, in one of the two lateral directions. Level sensor 16, which may be any suitable instrument, including, but not limited to, a suitable clinometer, must therefore be able to accurately measure the lateral tilt of the tipper truck. Preferably, level sensor 16, or a second level sensor (referred to collectively hereinafter as level sensor), is able to also sense the longitudinal, or front-to-back, orientation of the bin. This may be achieved with a single level sensor 16 using, for example, a dual-axis clinometer or with a pair of single-axis clinometers. Measuring both orientations provides additional information which can improve system performance. Measuring the longitudinal orientation provides additional information which is relevant in the determination of the stability of the equipment. Thus, for example, a truck which already possesses a significant backwards tilt is more prone to overturning than is a truck which begins the unloading process while perfectly level in the longitudinal sense. In other words, everything else being equal, a truck which has a certain backwards longitudinal tilt will overturn at a smaller lateral tilt angle than would a truck with a zero longitudinal tilt. A longitudinal tilt sensor mounted on the bin intrinsically takes such factors into account by measuring the total absolute inclination of the bin at any moment.

To enhance the effectiveness of a system according to the present invention, the tilt (or tilts) sensed by the lateral level sensor 16 (and preferably also of the longitudinal level sensor, if present) is processed so as to determine the rate of change of the flit. It has been determined that knowledge of the tilt angle in itself may be insufficient to prevent overturning. For example, because of the large mass and momentum of the truck and bin, a rapid increase in tilt angle may be such that by the time a critical tilt angle is reached it may be too late to prevent the overturning. Thus, it is important to monitor the rate of change of the tilt in addition to the monitoring the tilt itself so as to increase the effectiveness of the anti-overturning system.

Level sensor 16 may be connected by any suitable means to any appropriate portion of the tipper truck. Preferably, level sensor 16 is connected to bin 12 in a location, for example as shown in FIG. 4, which is sufficiently removed from the outlet end of bin 12 to avoid damage to level sensor 16 which might come about through contact with the load. Level sensor 16 may alternatively be mounted internally, for example, within the rear bar of the bin, so as to be protected from damage.

Figure 6:
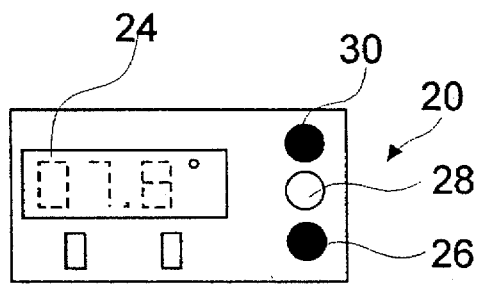
FIG. 6 is an example of a display which might be used as part of a system according to the present invention.

Level sensor 16 communicates with a suitable means for displaying information 20 concerning the orientation and change of orientation of the tipper truck (FIGS. 4 and 6). The communication may be through suitable wire connections (not shown) or by wireless transmission from level sensor 16 and reception at a suitable location near means for displaying information 20.

Means for displaying information 20 may be located at any suitable location, preferably inside the cabin, or at or near the location where the operator stands when operating the mechanism, such as hydraulic mechanism 14, which govern the raising and lowering of bin 12. Such a placement puts the desired information at a location which is easily accessible to the operator and ensures that any warnings or alarms are timely received by the operator.

Means for displaying information 20 may be of any suitable type and may display various parameters in various ways. Preferably, means for displaying information 20 includes a suitable display, such as a monitor or LCD readout, which displays the measured tilt angle in one or more orientations.

Preferably, means for displaying information 20 includes one or more alarms, which may be visual, such as blinking and/or various colored lights or may be audible, such as sirens, beeps and the like. Preferably, both visual and audio signals are used for indicating a potentially dangerous tilt angle, e.g., the approach within two degrees of a predetermined dangerous tilt angle, and the like.

For example, the illustrative display panel shown in FIG. 6 features a display 24 for displaying tilt angle or angles and three lights—a green light 26, a yellow light 28 and a red light 30, which may indicate, for example, a safe tilt angle, a tilt angle which is within a first predetermined angle or rate (e.g., two degrees) from the overturning tilt angle and a tilt angle which is within a second pre-determined angle (e.g., one degree) from the overturning tilt angle or rate, respectively.

Additionally or alternatively, display 24 and the three lights 26, 28 and 30, may indicate, a safe tilt angle change rate, a tilt angle change rate which exceeds a first pre-determined rate (e.g., one degree per second) or a dangerous tilt angle change rate which exceeds a second pre-determined rate (e.g., two degrees per second), respectively.

Preferably, the system includes a microprocessor or comparable device 32 for analyzing the data generated by level sensor 16, calculating tilt angles and tilt angle rates and for actuating the various displays and alarms. The microprocessor can also be used to automatically actuate the mechanism which is used to raise bin 12 as described below. Microprocessor 32 may be included in a single unit with display means 20, or mounted separately.

Specifically, microprocessor 32 preferably processes the instantaneous longitudinal and transverse inclination measurements to determine whether the bin is within a safe range of tilt operation for a given transverse inclination. Typically, each transverse inclination measurement is processed to derive a corresponding maximum safe longitudinal inclination of the bin. This processing may be performed either by comparison with preprogrammed look-up tables or by direct calculation by given formulae. The measured longitudinal inclination is then compared to the derived maximum safe value.

The use of both transverse and longitudinal bin inclination measurements avoids generation of false alarms when the bin is raised partially while on a slight transverse incline. This allows safe discharge of most types of load in circumstances in which the prior art systems would not permit any lifting of the bin.

Optionally, the processor may additionally process the rate of change of transverse inclination to identify dangerous rates of change significantly before a critical angle is reached.

Preferably, a system according to the present invention further includes means for interrupting or reversing the raising of bin 12 based on the orientation of the tipper truck as sensed by level sensor 16. Where, as is most typical, bin 12 is raised using hydraulic mechanism 14, means for interrupting or reversing the raising of bin 12 preferably includes a valve 22 for cutting off the inflow of hydraulic fluid into hydraulic mechanism 14, or for releasing hydraulic fluid from hydraulic mechanism 14, thereby automatically stopping or reversing the upward motion of bin 12 and preventing the further raising of the center of gravity of the vehicle and its continued destabilization, or actually lowering the center of gravity so as to increase the stability of the vehicle.

While the invention has been described with respect to a limited number of embodiments, it will be appreciated that many variations, modifications and other applications of the invention may be made.

What is claimed is:

1. A system for preventing the overturning of a tipper truck during the raising of a bin for purposes of unloading, the system comprising:

(a) a lateral level sensor associated with the tipper truck generating an output indicative of the lateral orientation of the tipper truck;
(b) a longitudinal level sensor associated with the bin of the tipper truck generating an output indicative of the longitudinal inclination of the bin;
(c) a processor for processing said outputs of said lateral and longitudinal level sensors to derive a measure of risk of overturning based on said inputs from both said lateral and longitudinal level sensors; and
(d) means for displaying an indication responsive to said measure of risk.

2. A system as in claim 1, wherein said processor includes means for processing said output of said lateral level sensor to calculate a rate of change of lateral inclination of the tipper truck.

3. A system as in claim 1, wherein said lateral level sensor is a clinometer.

4. A system as in claim 1, wherein said longitudinal level sensor is a clinometer.

5. A system as in claim 1, wherein said lateral level sensor is connected to the tipper truck.

6. A system as in claim 1, wherein said lateral level sensor is connected to the bin.

7. A system as in claim 1, further comprising means for interrupting the raising of the bin, said means being responsive to said processor.

8. A system as in claim 7, wherein the bin is raised using a hydraulic mechanism and wherein said means for interrupting the raising of the bin includes a valve for cutting off the inflow of hydraulic fluid into said hydraulic mechanism.

9. A system as in claim 7, wherein the bin is raised using a hydraulic mechanism and wherein said means for interrupting the raising of the bin includes a valve for releasing hydraulic fluid from said hydraulic mechanism so as to lower the bin.

10. A system as in claim 1, wherein said means for displaying an indication includes at least one alarm for indicating a potentially dangerous tilt angle.

11. A system as in claim 10, wherein said at least one alarm includes at least one light.

12. A system as in claim 10, wherein said at least one alarm includes one or more sounds.

13. A method for preventing the overturning of a tipper truck during the raising of a bin for purposes of unloading, the method comprising the steps of:

(a) generating a first output indicative of the lateral inclination of the tipper truck;
(b) generating a second output indicative of the longitudinal inclination of the bin; and
(c) processing both said first and second outputs to determine a measure of risk of overturning of the tipper truck, said processing including:
 (i) processing said first output to determine a maximum safe longitudinal inclination of the bin as a function of the lateral inclination of the tipper truck; and
 (ii) comparing said second output with said maximum safe longitudinal inclination.

14. The method as in claim 13, further comprising a step of deriving a rate of change of lateral inclination of the tipper truck.

15. The method as in claim 13, further comprising a step of interrupting raising of the bin when said second output indicates a longitudinal inclination of the bin greater than said maximum safe longitudinal inclination.

16. The method as in claim 14, further comprising a step of interrupting raising of the bin when said rate of change of lateral inclination exceeds a given value.

* * * * *